United States Patent
Liao

(10) Patent No.: US 10,243,374 B2
(45) Date of Patent: Mar. 26, 2019

(54) MOBILE DEVICE AND METHOD OF MANAGING CHARGING CURRENT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Ming-Yu Liao, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 508 days.

(21) Appl. No.: 15/006,146

(22) Filed: Jan. 26, 2016

(65) Prior Publication Data

US 2016/0218527 A1 Jul. 28, 2016

(30) Foreign Application Priority Data

Jan. 26, 2015 (TW) .............................. 104102441 A

(51) Int. Cl.
*H02J 7/00* (2006.01)
*G06F 1/26* (2006.01)

(52) U.S. Cl.
CPC .............. *H02J 7/0018* (2013.01); *G06F 1/26* (2013.01); *G06F 1/266* (2013.01); *H02J 7/0021* (2013.01); *H02J 7/0072* (2013.01); *Y02B 40/90* (2013.01)

(58) Field of Classification Search
CPC ........ H02J 7/0021; H02J 7/0072; G06F 1/266

USPC ................................. 320/107, 125, 134, 163
See application file for complete search history.

(56) References Cited

U.S. PATENT DOCUMENTS

| | | | |
|---|---|---|---|
| 2009/0100275 A1* | 4/2009 | Chang | G06F 1/266 713/300 |
| 2011/0018344 A1* | 1/2011 | Liao | G06F 1/266 307/31 |
| 2013/0147273 A1 | 6/2013 | van der lee et al. | |

FOREIGN PATENT DOCUMENTS

| CN | 1444151 A | 9/2003 |
|---|---|---|
| CN | 100508460 C | 7/2009 |
| CN | 101944758 A | 1/2011 |
| CN | 101963835 A | 2/2011 |
| CN | 103199595 A | 7/2013 |
| CN | 203151234 | 8/2013 |
| CN | 103390912 A | 11/2013 |

(Continued)

*Primary Examiner* — Edward Tso
*Assistant Examiner* — Aaron Piggush
(74) *Attorney, Agent, or Firm* — ScienBiziP, P.C.

(57) ABSTRACT

A device which includes interfaces, a measurement unit, a switching unit, and a control unit is used to parcel out charging currents to other chargeable devices, and allow partial charging of certain devices when full power is not available. The interfaces are connected to the chargeable devices. The measurement unit is connected to the power supply unit and the interfaces, and obtains a maximum supply current of the power supply unit and charging currents for the chargeable devices. The switching unit is connected between the measurement unit and the interfaces. The control unit is connected to the measurement unit and the switching unit, and selectively allows charging of the chargeable devices by controlling the switching unit according to the maximum supply current and the charging currents required.

9 Claims, 4 Drawing Sheets

(56) References Cited

FOREIGN PATENT DOCUMENTS

| | | |
|---|---|---|
| CN | 203690984 | 7/2014 |
| EP | 2706644 A1 | 3/2014 |
| TW | 354205 | 3/1999 |
| TW | M431500 | 6/2012 |

* cited by examiner

MOBILE DEVICE AND METHOD OF MANAGING CHARGING CURRENT

FIELD

The subject matter herein generally relates to mobile devices and methods of managing charging current.

BACKGROUND

Mobile devices, such as mobile phones, mobile power supply units, pocket personal computers, and personal digital assistants (PDA) need to be charged or recharged. When a conventional external power supply is utilized to charge a plurality of mobile devices, it is not able to simultaneously charge the plurality of mobile devices with individual control of the charging.

SUMMARY

In one aspect of the disclosure, a mobile device includes a plurality of interfaces, a measurement unit, a switching unit, and a control unit. The interfaces are coupled to electrical devices which require charging (chargeable devices). The measurement unit is coupled to the power supply unit and the interfaces, and obtains a maximum supply current of the power supply unit and charging currents for the chargeable devices. The switching unit is coupled between the measurement unit and the interfaces. The control unit is coupled to the measurement unit and the switching unit, and selectively charges the chargeable devices by controlling the switching unit according to the maximum supply current and the charging currents.

In one aspect of the disclosure, a method of managing charging current applied in a mobile device which is coupled to a power supply unit and a plurality of chargeable devices comprises obtaining a maximum supply current of the power supply unit and charging currents for the chargeable devices, and selectively charging the chargeable devices according to the maximum supply current and the charging currents relevant to each chargeable device.

BRIEF DESCRIPTION OF THE DRAWINGS

Implementations of the present technology will now be described, by way of example only, with reference to the attached figures, wherein.

DETAILED DESCRIPTION

Figure 1:
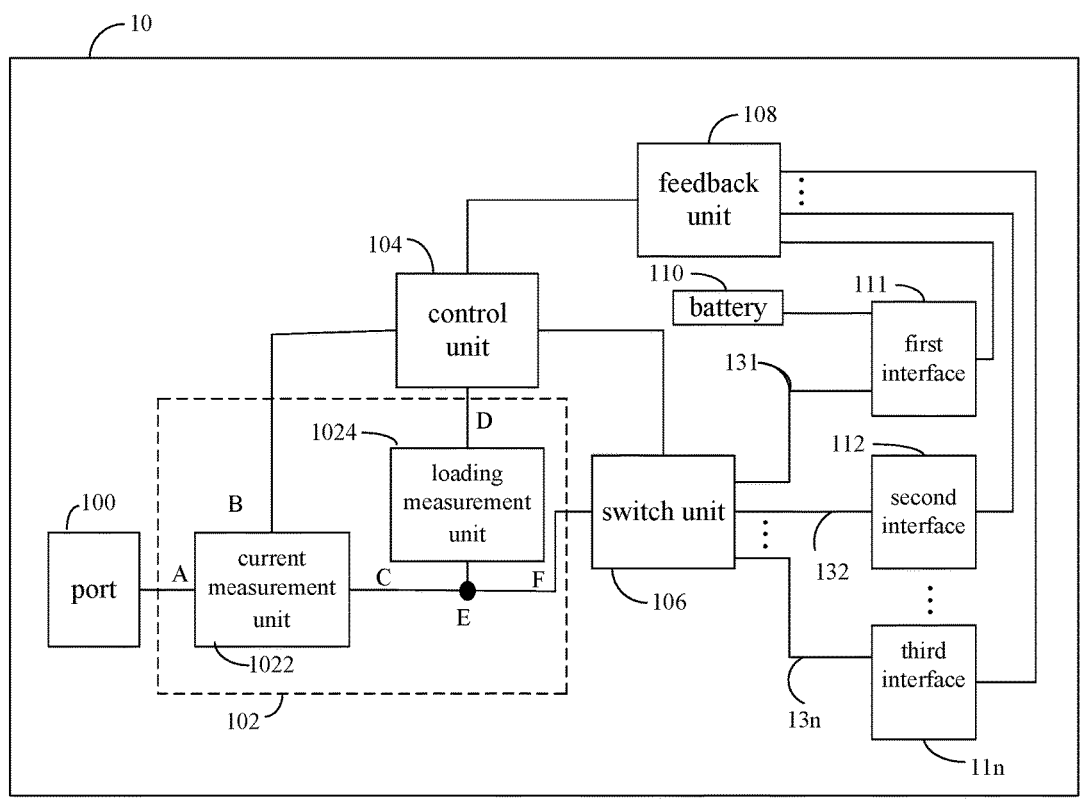
FIG. 1 is a block diagram of a mobile device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

In the described embodiments, the direction of the arrow indicates the path of a signal.

FIG. 1 shows a mobile device 10 according to an embodiment of the disclosure. In an embodiment, the mobile device 10 comprises a port 100, a measurement unit 102, a control unit 104, a switching unit 106, a feedback unit 108, and a plurality of interfaces 111-11$n$. The mobile device 10 is electrically connected to an external power supply unit through the port 100.

The interfaces include a first interface 111, a second interface 112, and an nth interface 11$n$. The interfaces can be electrically connected to external chargeable devices. The external chargeable devices may comprise a battery 110 of the mobile device 10 and external devices such as mobile phones, mobile power supply units, pocket personal computers, and personal digital assistants. The mobile device 10 charges the external devices through the interfaces 111-11$n$. In an embodiment, the battery 110 of the mobile device 10 is electrically connected to the first interface 111.

The measurement unit 102 is electrically connected to the port 100, and obtains the maximum supply current of the external power supply unit. In an embodiment, the measurement unit 102 may comprise a current measurement unit 1022 and a loading measurement unit 1024. The current measurement unit 1022 is electrically connected between the port 100 and the switching unit 106, to obtain the charging currents for the battery 110 and the external devices to be charged. The loading measurement unit 1024 is electrically connected to the connection point between the current measurement unit 1022 and the switching unit 106, to obtain the maximum supply current of the external power supply unit. The current measurement unit 1022 and the loading measurement unit 1024 are electrically connected to the control unit 104, and transmit the obtained charging currents and the maximum supply current to the control unit 104.

The switching unit 106 is electrically connected to the measurement unit 102 and the interfaces 111-11$n$. The charging path between the switching unit 106 and the first interface 111 is the first path 131, the charging path between the switching unit 106 and the second interface 112 is the second path 132, and the charging path between the switching unit 106 and the nth interface 11$n$ is the nth path 13$n$. The control unit 104 is electrically connected to the measurement unit 102 and switching unit 106.

The control unit 104 is electrically connected to the measurement unit 102 and the switching unit 106. The control unit 104 controls the connection status of the switching unit 106 to selectively charge the external chargeable devices according to the maximum supply current obtained by the measurement unit 102. In an embodiment, the control unit 104 compares the maximum supply current of the external power supply unit with a predetermined value. The predetermined value can be a minimum value. The control unit 104 connects the charging paths between the measurement unit 102 and any of the interfaces 111-11n when the maximum supply current of the external power supply unit exceeds the predetermined value, and controls the measurement unit 102 to obtain the charging currents for the battery 110 and the external devices to be charged.

The control unit 104 compares a total current of the charging currents for the battery 110 and the external chargeable devices with the maximum supply current of the external power supply unit. The charging currents for the battery 110 and the external chargeable devices are decreased proportionately when the total of the charging currents required exceeds the maximum supply current. In an embodiment, the charging currents can be decreased one by one. One or more of the charging currents for the battery 110 and the external chargeable devices are kept at a lower level until the total current of the charging currents required is less or equal to the maximum supply current. Thus, the control unit 104 charges at least one of the battery 110 and each of the external chargeable devices by controlling the switching unit 106. The control unit 104 charges one of the battery 110 and each external chargeable device when the maximum supply current is less than or equal to the predetermined value, and charges all the battery 110 and the external chargeable devices when the maximum supply current exceeds the total current of the charging currents required.

In an embodiment, the maximum supply current of the external power supply unit can be 4 amps (A), the charging current of the battery 110 can be 2 A, the charging current of the first external device to be charged can be 1 A, and the charging current of the second external device to be charged can be 2 A. The control unit 104 may charge the battery 110 and the second external chargeable device by controlling the switching unit 106. Thus, the external power supply unit can charge the battery 110 and an external device simultaneously, reducing the overall charging time and improving the charging efficiency.

The feedback unit 108 is electrically connected to the interfaces 111-11n and the control unit 104. The feedback unit 108 determines whether there is a short circuit or a reversed connection in the charging paths. The control unit 104 disconnects a charging path when there is a short circuit or a reversed connection in that charging path, to ensure safety. In addition, the feedback unit 108 obtains the charged status of the battery 110 and each external chargeable device for the control unit 104. The charged status can be information that the battery 110 and the external chargeable devices, or one or more of them, are fully charged.

In an embodiment, the interfaces 111-11n have different charging priorities. The control unit 104 controls the switching unit 106 to charge the external chargeable devices according to the order of charging priority of the corresponding interface. In this embodiment, the control unit 104 charges the battery 110 electrically connected to the first interface 111 first when the first interface 111 has the highest charging priority.

In an embodiment, the current measurement unit 1022 comprises a first terminal A, a second terminal B, and a third terminal C. The loading measurement unit 1024 comprises a first terminal D and a second terminal E. The switching unit 106 comprises a first terminal F.

The first terminal A of the current measurement unit 1022 is electrically connected to the port 100, the second terminal B of the current measurement unit 1022 is electrically connected to the control unit 104, and the third terminal C of the current measurement unit 1022 is electrically connected to the first terminal F of the switching unit 106. The first terminal D of the loading measurement unit 1024 is electrically connected to the control unit 104, and the second terminal E of the loading measurement unit 1024 is electrically connected to a connection point between the third terminal C of the current measurement unit 1022 and the first terminal F of the switching unit 106.

Figure 2:
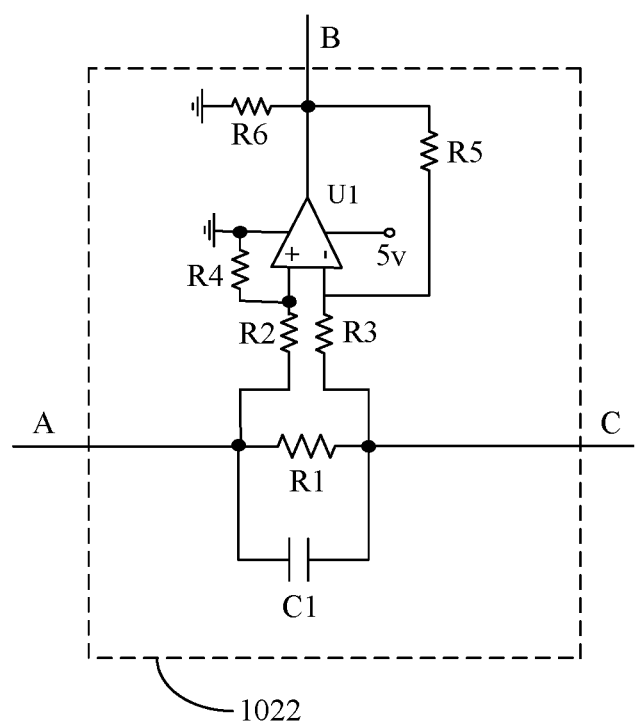
FIG. 2 is a circuit diagram of the current measurement unit in FIG. 1 according to an embodiment of the disclosure.

FIG. 2 shows a circuit diagram of the current measurement unit 1022 of the mobile device 10 in FIG. 1 according to an embodiment of the disclosure. In an embodiment, the current measurement unit 1022 comprises resistors R1-R6, a capacitor C1, and a comparator U1. The resistor R1 and the capacitor C1 are electrically connected in parallel, and are electrically connected between the first terminal A and the third terminal C of the current measurement unit 1022. The comparator U1 comprises a non-inverting input terminal, an inverting input terminal, a first voltage input terminal, a second voltage input terminal, and an output terminal. The non-inverting input terminal is coupled to a connection point between the resistor R1 and the power supply unit, the inverting input terminal is coupled to a connection point between the switching unit 106 and the resistor R1, and the output terminal is coupled to the control unit 104.

One terminal of the resistor R2 is electrically connected to the non-inverting input terminal of the comparator U1, and another terminal of the resistor R2 is electrically connected to a connection point between the first terminal A of the current measurement unit 1022 and the resistor R1. One terminal of the resistor R4 is electrically connected to a connection point between the resistor R2 and the comparator U1, and another terminal of the resistor R4 is electrically connected to a connection point between the first voltage input terminal of the comparator U1 and ground.

The second voltage input terminal of the comparator U1 is electrically connected to the voltage terminal having 5 volts (V). One terminal of the resistor R3 is electrically connected to the inverting input terminal of the comparator U1, and another terminal of the resistor R3 is electrically connected to a connection point between the third terminal C of the current measurement unit 1022 and the resistor R1. The output terminal of the comparator U1 is electrically connected to the second terminal B of the current measurement unit 1022. One terminal of the resistor R5 is electrically connected to a connection point between the resistor R3 and the inverting input terminal of the comparator U1. Another terminal of the resistor R5 is electrically connected to a connection point between the output terminal of the comparator U1 and the second terminal B of the current measurement unit 1022. The resistor R6 is electrically connected between the output terminal of the comparator U1 and ground.

Figure 3:
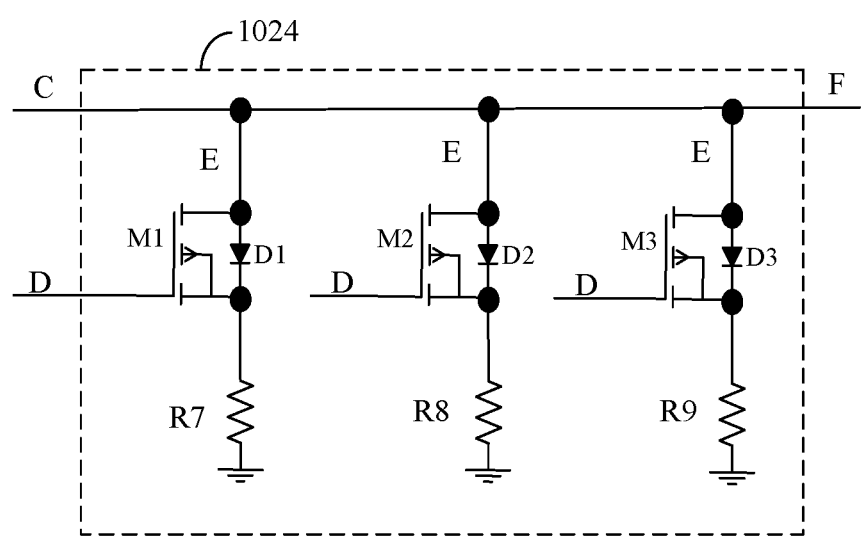
FIG. 3 is a circuit diagram of the loading measurement unit shown in FIG. 1 according to an embodiment of the disclosure.

FIG. 3 shows a circuit diagram of the loading measurement unit 1024 of the mobile device 10 in FIG. 1 according to an embodiment of the disclosure. In an embodiment, the loading measurement unit 1024 comprises field-effect transistors M1-M3, diodes D1-D3, and resistors R7-R9. The field-effect transistor comprises a gate, a source, and a drain. The gates of the field-effect transistors M1-M3 are electrically connected to the first terminal D of the loading measurement unit 1024. The drains of the field-effect transistors M1-M3 are electrically connected to the second terminal E of the loading measurement unit 1024, and the sources of the field-effect transistors M1-M3 are electrically connected to ground.

The diodes D1-D3 are electrically connected between the sources and the drains of the FETs M1-M3. The anodes of the diodes D1-D3 are connected to the drains of the FETs M1-M3. The resistors R7-R9 are connected between the sources of the FETs M1-M3 and ground.

The FETs M1-M3 can be replaced by bipolar junction transistors, and the channels of the FETs M1-M3 can be P-channel or N-channel depending on the conduction direction required.

Figure 4:
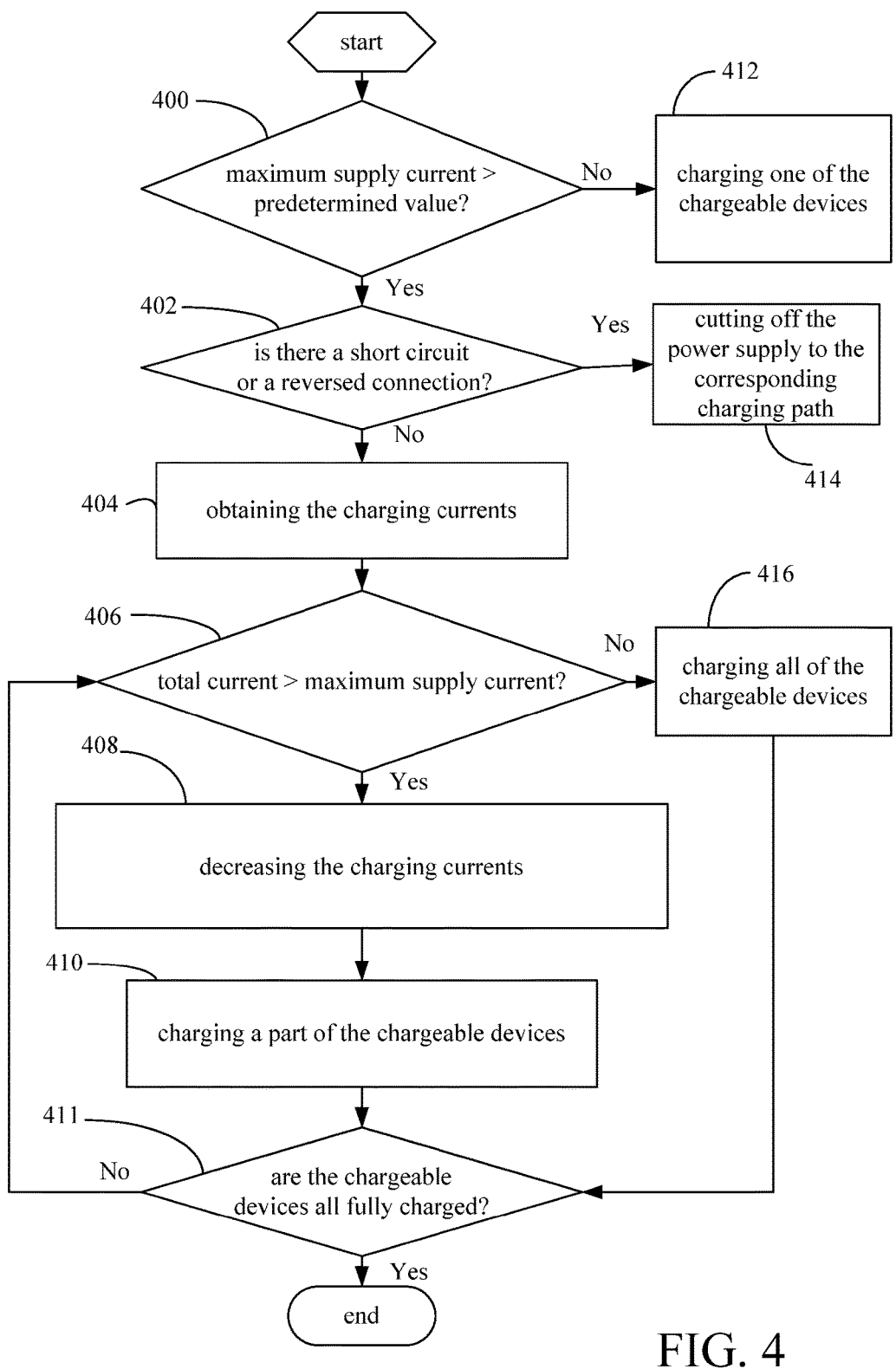
FIG. 4 is a flowchart of a method of managing charging currents according to an embodiment of the disclosure.

FIG. 4 shows a flowchart of a method of managing charging currents according to an embodiment of the disclosure. The method is applied to the mobile device 10 of FIG. 1, and is performed by the elements in FIG. 1. At block 400, the measurement unit 102 obtains the maximum supply current of the external power supply unit, and the control unit 104 compares the maximum supply current of the external power supply unit with a predetermined value. When the maximum supply current of the external power supply unit exceeds the predetermined value, the process goes to block 402. At block 402, the feedback unit 108 determines whether there is a short circuit or a reversed connection in the charging paths (131-13n) of the mobile device 10. When there is a short circuit or a reversed connection in the charging paths (131-13n), the process goes to block 414. At block 414, the control unit 104 disconnects the charging paths corresponding to the short circuit or a reversed connection. In an embodiment, the control unit 104 controls the switching unit 106 to cut off the power supply to the corresponding charging path. For example, when there is a short circuit in the charging path 132, the control unit 104 controls the switching unit 106 to cut off the power supply to the charging path 132.

When the maximum supply current is determined less than or equal to the predetermined value at block 400, the process goes to block 412. At block 412, the control unit 104 charges one of the chargeable devices by controlling the switching unit 106. The chargeable devices may comprise the battery 110 and the external devices. For example, the control unit 104 may charges the battery 110 only, without charging other external devices. In another embodiment, at block 404, when there is no short circuit or reversed connection among the charging paths, the measurement unit 102 obtains the charging currents for the battery 110 and the external devices to be charged.

At block 406, the control unit 104 compares a total current of the charging currents for the battery 110 and the external devices with the maximum supply current of the external power supply unit. When the total current of the charging currents for the battery 110 and the external devices exceeds the maximum supply current, the process goes to block 408. At block 408, the charging currents for the battery 110 and the external devices are decreased proportionately. In an embodiment, the charging currents can be decreased one by one. For example, the charging current corresponding to the charging path 13n can be decreased first, and if the total current of the charging currents for the battery 110 and the external devices still exceeds the maximum supply current, then the charging current corresponding to the charging path 13(n-1) will be decreased. One or more of the charging currents for the battery 110 and the external devices are kept at a lower level until the total current of the charging currents required is less or equal to the maximum supply current. In an embodiment, one or more of the charging currents for the battery 110 and the external devices is decreased to zero.

At block 410, the mobile device 10 charges one or a part of the battery 110 and the external devices. That is, at least one of the battery 110 and the external devices are not being charged. At block 411, the control unit 104 determines whether the battery 110 and the external devices are all fully charged. When the battery 110 and the external devices are not fully charged, the process goes to block 406 to compare the total current of the charging currents for the battery 110 and the external devices with the maximum supply current of the external power supply unit. At block 406, when the total current of the charging currents for the battery 110 and the external devices is determined less than or equal to the maximum supply current of the external power supply unit, the process goes to block 416. At block 416, the mobile device 10 charges all the battery 110 and the external devices. At block 411, when the battery 110 and the external devices are all determined fully charged, the process is completed.

Accordingly, embodiments of the disclosure provide mobile devices and methods of managing charging current. The charging currents are managed to improve the charging efficiency. In addition, the external power supply unit can charge the battery 110 and the external devices simultaneously, reducing the overall charging time. In addition, the feedback mechanism also ensures the safety of the charging process.

The embodiments shown and described above are only examples. Many details are often found in the art such as the other features of signal filtering and power regulating. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mobile device coupled to a power supply unit and a plurality of chargeable devices, comprising:
   a plurality of interfaces respectively coupled to the chargeable devices;
   a measurement unit coupled to the power supply unit and the interfaces, and which obtains a maximum supply current of the power supply unit and charging currents for the chargeable devices;
   a switching unit coupling the measurement unit and the interfaces; and
   a control unit coupled with the measurement unit and the switching unit, selectively charging the chargeable devices by controlling the switching unit according to the maximum supply current and the charging currents;
   wherein the measurement unit comprises:
     a current measurement unit coupled between the power supply unit and the switching unit, obtaining the charging currents; and
     a loading measurement unit coupled to a connection point between the current measurement unit and the switching unit, obtaining the maximum supply current, wherein the current measurement unit and the loading measurement unit are coupled to the control unit, and transmit the obtained charging currents and the maximum supply current to the control unit; and wherein the loading measurement unit comprises:
- a field-effect transistor, wherein a gate of the field-effect transistor is coupled to the control unit, a drain of the field-effect transistor is coupled to a connection point between the current measurement unit and the switching unit;
- a diode coupled between the drain and a source of the field-effect transistor; and
- a second resistor coupled between the source of the field-effect transistor and a ground level.

2. The mobile device of claim 1, wherein the chargeable devices comprise a battery and external devices to be charged.

3. The mobile device of claim 1, wherein the control unit compares the maximum supply current with a predetermined value, and controls the measurement unit to obtain the charging currents for the chargeable devices when the maximum supply current exceeds the predetermined value.

4. The mobile device of claim 1, wherein the control unit compares a total current of the charging currents for the chargeable devices with the maximum supply current, the charging currents for the chargeable devices are decreased proportionately until the maximum supply current exceeds the total current, and the control unit controls the switching unit to charge one or a part of the chargeable devices.

5. The mobile device of claim 1, further comprising:
- a feedback unit coupled to the control unit and the interfaces, determining whether there is a short circuit or a reversed connection in the charging paths corresponding to the chargeable devices, and disconnecting the corresponding charging paths when there is the short circuit or the reversed connection.

6. The mobile device of claim 1, wherein the control unit compares the maximum supply current with a predetermined value, and charges one of the chargeable devices when the maximum supply current is less than or equal to the predetermined value.

7. The mobile device of claim 1, wherein the control unit compares the maximum supply current with a total current of the charging currents for the chargeable devices, and controls the switching unit to charge all of the chargeable devices when the maximum supply current exceeds the total current.

8. The mobile device of claim 1, wherein the interfaces have different charging priorities, and the control unit controls the switching unit to charge the chargeable devices according to the charging priorities.

9. The mobile device of claim 1, wherein the current measurement unit comprises:
- a first resistor and a capacitor, the first resistor and the capacitor are coupled in parallel and are coupled between the power supply unit and the switching unit; and
- a comparator comprising a non-inverting input terminal, an inverting input terminal and an output terminal, wherein the non-inverting input terminal is coupled to a connection point between the first resistor and the power supply unit, the inverting input terminal is coupled to a connection point between the switching unit and the first resistor, and the output terminal is coupled to the control unit.

* * * * *